(12) United States Patent
Morioka et al.

(10) Patent No.: US 6,912,558 B2
(45) Date of Patent: Jun. 28, 2005

(54) MULTIPLICATION MODULE, MULTIPLICATIVE INVERSE ARITHMETIC CIRCUIT, MULTIPLICATIVE INVERSE ARITHMETIC CONTROL METHOD, APPARATUS EMPLOYING MULTIPLICATIVE INVERSE ARITHMETIC CIRCUIT, AND CRYPTOGRAPHIC APPARATUS AND ERROR CORRECTION DECODER THEREFOR

(75) Inventors: Sumio Morioka, Yamato (JP); Yasunao Katayama, Hachiouji (JP)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 09/990,021

(22) Filed: Nov. 21, 2001

(65) Prior Publication Data

US 2002/0032711 A1 Mar. 14, 2002

(51) Int. Cl.[7] .................................................. G06F 7/72
(52) U.S. Cl. ........................................................ 708/492
(58) Field of Search ........................... 708/492–493, 708/491

(56) References Cited

U.S. PATENT DOCUMENTS

| | | | | |
|---|---|---|---|---|
| 5,448,510 A | * | 9/1995 | Lee | 708/492 |
| 5,467,297 A | * | 11/1995 | Zook | 708/492 |
| 5,612,910 A | * | 3/1997 | Meyer | 708/492 |
| 6,052,704 A | * | 4/2000 | Wei | 708/492 |
| 6,101,520 A | * | 8/2000 | Lan et al. | 708/492 |
| 6,138,133 A | * | 10/2000 | Oh | 708/492 |
| 6,760,742 B1 | * | 7/2004 | Hoyle | 708/492 |
| 6,779,011 B2 | * | 8/2004 | Weng et al. | 708/492 |

* cited by examiner

Primary Examiner—D. H. Malzahn
(74) Attorney, Agent, or Firm—Whitham, Curtis & Christofferson, P.C.; Stephen C. Kaufman

(57) ABSTRACT

A multiplication module, including a first input unit and a second input unit, for multiplying m bits of data in a Galois field $GF(2^m)(m \geq 1)$, includes: first and second power arithmetic units for receiving the first m bits of data from the first input unit; a first multiplication unit for receiving the first m bits of data and the output of the first power arithmetic unit; a second multiplication unit for receiving second m bits of data from the second input unit and the output of the second power arithmetic unit; a selection unit for receiving an output signal from the second multiplication unit and the second m bits of data; and a control unit for outputting a control signal to the first power arithmetic unit, the second arithmetic unit and the selection unit, wherein the first power arithmetic unit receives a first control signal, the second power arithmetic unit receives a second control signal, and the selection unit receives a third control signal, for controlling the output of the selection unit, while the first multiplication unit outputs a first output signal, and the selection unit outputs a second output signal.

33 Claims, 10 Drawing Sheets

Multiplication device used for the circuit configuration

Example calculation process using Fermat's little theorem (m = 16)

Example calculation process using Fermat's little theorem (m = 16)

Example calculation process using the algorithm of Itoh and Tsujii (m = 16)

Basic arithmetic module

Multiplication device used for the circuit configuration

Fig. 6 Overall configuration method 2 when a basic arithmetic module is provided as a sequential circuit Overall configuration method when a basic arithmetic module is provided as a combinational circuit 1. Case wherein a sequential circuit is implemented:

Repeat the following $[\log_2 (m-1)]$ times
      At the $k$-th cycle ($k$ is a natural number),
        the power arithmetic circuit 1 calculates $2^{k-1}$ powers of 2,
        the power arithmetic circuit 2 calculates $\{(m-1) \mod (2^{k-1})\} + 1$ powers of 2.
        The output of the multiplier 1 is selected as the input for the register R1.
        When in the binary expression $m-1$ bit $k-1$ is 1,
          the output of the multiplier 2 is selected as the input for the register 2, and
        in other cases,
          the output of the register R2 is selected as the input of the register R2.

---

2. In a case where a combinational circuit is implemented:

Modules 1, 2, 3, ... are defined from the input side to the output side, and the control signals for module $k$ permit
      the power arithmetic circuit 1 to calculate $2^{k-1}$ powers of 2, and
      the power arithmetic circuit 2 to calculate $\{(m-1) \mod (2^{k-1})\} + 1$ powers of 2.
      When bit $k-1$ is 1 in the binary expression,
        the output of the multiplier 2 is selected as the output B,
      while in other cases
        the input B is selected as the output B.

When the combinational circuit is implemented, the multiplier that always receives the constant $\alpha^0$ at one of the input terminals is deleted, and the other input terminal is connected to the output terminal of the multiplier.

Specific method for generating control signals for each module

Fig. 8

Specific example of control signals to be provided for modules (m = 15)

MULTIPLICATION MODULE, MULTIPLICATIVE INVERSE ARITHMETIC CIRCUIT, MULTIPLICATIVE INVERSE ARITHMETIC CONTROL METHOD, APPARATUS EMPLOYING MULTIPLICATIVE INVERSE ARITHMETIC CIRCUIT, AND CRYPTOGRAPHIC APPARATUS AND ERROR CORRECTION DECODER THEREFOR

BACKGROUND OF THE INVENTION

1. Field of the Invention

The present invention relates to a multiplication module, a multiplicative inverse arithmetic circuit, and a method and an apparatus for controlling the multiplicative inverse arithmetic circuit. More particularly, the present invention pertains to a multiplication module that can perform multiplicative inverse arithmetic using a Galois extension field $GF(2^m)$ (m is an arbitrary natural number) by employing a small circuit having a low latency and a multiplicative inverse arithmetic circuit therefor, a method and an apparatus for controlling the multiplicative inverse arithmetic circuit, and a cryptographic apparatus and an error correction decoder therefor.

2. Background Art

First, the evaluation points for a reciprocal arithmetic algorithm for employing hardware, including the present invention, are as follows:

(1) the number of multipliers
(2) the number of registers
(3) the latency (clock count*clock frequency in the case of a sequential circuit). This is extremely dependent on the number of multiplication processes performed.
(4) the maximum operating frequency for a sequential circuit. When an arithmetic operation can be performed with the same clock count, naturally, a circuit having a higher maximum operating frequency is better. But when the maximum operating frequency is the same, a circuit that requires a smaller clock count for computation is better.

Relative to the above points, a comparison of the difference between conventional methods and the method of the present invention will be explained later, after an overview of the conventional methods has been given.

Method 1: Fermat's Little Theorem

As is described in reference documents [1] and [4], a multiplicative inverse element can be obtained by using the following formula:

$$x^{-1} = x^{2^m-2} = x^{2^1} x^{2^2} \ldots x^{2^{m-1}}. \quad \text{[Expression 1]}$$

When this formula is employed, m−2 multiplications are required.

To employ this formula to perform calculations using a sequential circuit, a frequently used algorithm, based on the calculation process shown in FIG. 1, is one according to which one multiplier and one square circuit are employed to calculate i powers of $(x^2)$ for (m−2) loops. The latency (cycle count) for the calculations is (m−2).

To calculate the formula using a combinational circuit, the tree structure shown in FIG. 2 is prepared to provide for a multiplier the latency $$M\{[\log_2(m-2)+1]\} \quad \text{[Expression 2]}$$

(Generally, since the latency of the power arithmetic is extremely small, it is ignored).

Method 2: An Algorithm by Itoh and Tsujii and a Similar Method

Of all the conventional algorithms, an algorithm (by Itoh and Tsujii) shown in reference document [2] requires the smallest minimum number of multiplications. An example calculation process, in which m=16, is shown in FIG. 3.

For another algorithm, which Itoh, et. al. proposed in reference document [3] before referring to the above algorithm, power number 2m−2 is recursively divided using a relationship such as $$2^k - 1 = 2(2^{k/2}-1)(2^{k/2}+1), \quad \text{[Expression 3]}$$

and when actually used for a calculation, the multiplication and the power arithmetic are performed from the bottom up, in the reverse order. According to either algorithm, the number of cycles for a the sequential circuit is expressed by $$[\log_2(m-1) + Hw(m-1) - 1, \quad \text{[Expression 4]}$$

where $Hw(x)$ denotes Humming Weight of the binary representation of x.

For the combinational circuit, the latency M of the multiplier is $$M\{[\log_2(m-1)] + Hw(m-1) - 1\} \quad \text{[Expression 5]}$$

(the latency for the power arithmetic is extremely small and is ignored).

Unlike method 1, a problem with both of the algorithms is that correct results can not be obtained unless all of the multiplications are sequentially performed.

Method 3: Method Using Multiplication and Multiplicative Inverse Arithmetic Combination for Subfield According to a method disclosed in reference documents [2] and [4], when m=kq (m is a composite number), the multiplicative inverse arithmetic used for $GF(2^m)$ results in the multiplication of $GF(2^m)$ and the multiplicative inverse arithmetic for $GF(2^k)$ (or $GF(2^q)$). Using this method, when an irreducible polynomial and a representation basis were appropriately selected, in one case there was a considerable reduction in circuit size and an increase in circuit speed.

The use of this method, however, is limited. For example, this method can not be used if m is a prime number, and depending on the irreducible polynomial of a target field $GF(2^m)$, a reduction in circuit size and an increase in circuit speed can not be obtained.

Method 4: Euclidean Algorithm

Disclosed in reference document [5] is a method for calculating a multiplicative inverse using the Euclidean algorithm over polynomials. This method employs a property whereby, when an input polynomial (target polynomial for obtaining a multiplicative inverse) is defined as A and the irreducible polynomial is defined as F, values B and M, which satisfy BA+FM=1, are calculated using the Euclidean algorithm, and B is the multiplicative inverse of A. One problem encountered with this method is that the latency is generally O(m).

Reference Documents:

[1] S. B. Wicker and V. K. Bhargava (eds.), Reed Solomon Codes and Their Applications, IEEE Press, 1994.
[2] T. Itoh and S. Tsujii, "A Fast Algorithm For Computing Multiplicative Inverses In $GF(2^m)$ Using Normal Bases," Information and Computation, Vol. 78, No. 3, pp. 171–177, 1988.
[3] T. Itoh, O. Teechai and S. Tsujii, "A Fast Algorithm For Computing Multiplicative Inverses In $GF(2^m)$ Using Normal Bases, J. Society For Electronic Communications (Japan), 44, 31–36, 1986.

[4] J. Guajardo and C. Paar, "Efficient Algorithms For Elliptic Curve Cryptosystems," proc. of 17th Annual Intl. Cryptology Conf. (CRYPTO' 97), LNCS1294, pp. 342–356, 1997.

[5] H. Brunner, A. Curiger and M. Hofstetter, "On Computing Multiplicative Inverses In GF($2^m$)", IEEE Trans. Computers, Vol. 42, pp. 1010–1015, 1993.

A problem with the algorithm provided by Itoh is that the latency of a circuit is increased when only a small number of multiplication procedures is required. The Fermat's little theorem also has latency problems, but in this case, for a combinational circuit, the latency becomes smaller when the size of the circuit is increased, whereas for a sequential circuit, the latency is increased.

According to the present invention, use is made of the advantages offered by the two methods, and for both a sequential circuit and a combinational circuit, both circuit size and latency are reduced. With this invention, unlike with a normal circuit design that follows a trade-off relation between speed and area, problems associated with both speed and area are resolved.

According to the present invention, low latency (a small process clock count for the sequential circuit, or a small delay for the combinational circuit) is achieved for any value of m, using a combination of basic modules, without increasing the number of multiplication procedures. According to all of the conventional methods, the reduction of latency, which is difficult, or the provision of means to reduce latency, involves a drastic increase in circuit size. In the event, the specific problems that are encountered are as follows.

(1) According to the method for calculating Fermat's little theorem, when a combinational circuit is employed latency can be improved by up to $$M\{[\log_2(m-2)]+1\}; \quad \text{[Expression 6]}$$

but to do this, m−2 multiplication circuits are required.

(2) According to the method proposed by Itoh and Tsujii, and a similar method, as a whole, only $$[\log_2(m-1)]+Hw(m-1)-1 \quad \text{[Expression 7]}$$

multiplication procedures are required; although even then, it is difficult to improve latency. For a sequential circuit, the latency is $$[\log_2(m-1)]+Hw(m-1)-1 \quad \text{[Expression 8]}$$

cycles, and for a combinational circuit, $$M([\log_2(m-1)]+Hw(m-1)-1) \quad \text{[Expression 9]}$$

cycles. These results are worse than those provided by the Fermat's little theorem.

(3) According to the method that results in the division of the subfield, only a limited m and an irreducible polynomial are used. This method is not presented in opposition to the method of the present invention, and when this method and the method of the invention are employed together, circuit performance can be even further improved.

(4) According to the Euclidean algorithm, a latency 0(m) is obtained; but obtaining an improved latency is not easy.

According to the method of the invention, even though the total number of multiplication procedures is the same as for the algorithm proposed by Itoh and Tsujii (smaller than for the Fermat's little theorem), latency can be reduced until its maximum is about half that obtained by Itoh and Tsujii (the same as is obtained by Fermat's little theorem).

SUMMARY OF THE INVENTION

A multiplicative inverse calculation is performed using multiplication and power arithmetic. However, the circuit performance differs depending on the progress of a calculation. In this invention, a low latency (a small process clock count for a sequential circuit, or a short delay for a combinational circuit) is achieved using a combination of basic modules, without increasing the number of multiplication processes.

Specifically, it is one object of the present invention to provide a multiplication module, a multiplicative inverse arithmetic circuit, and a method and an apparatus for controlling the multiplicative inverse arithmetic circuit, and a cryptographic apparatus and an error correction decoder therefor.

To achieve the above object, according to a first aspect of the invention, a multiplication module, including a first input unit and a second input unit, for multiplying m bits of data in a Galois field $GF(2^m)(m \geq 1)$, comprises: first and second power arithmetic means for receiving the first m bits of data from the first input unit; first multiplication means for receiving the first m bits of data and the output of the first power arithmetic means; second multiplication means for receiving second m bits of data from the second input unit and the output of the second power arithmetic means; selection means for receiving an output signal from the second multiplication means and the second m bits of data; and control means for outputting a control signal to the first power arithmetic means, the second arithmetic means and the selection means, wherein the first power arithmetic means receives a first control signal, the second power arithmetic means receives a second control signal, and the selection means receives a third control signal, for controlling the output of the selection means, while the first multiplication means outputs a first output signal, and the selection means outputs a second output signal.

According to a second aspect of the invention, a multiplicative inverse arithmetic circuit comprises: the multiplication module according to the first aspect; first register means for setting a first initial value and for receiving a first output signal from the multiplication module; and second register means for setting a second initial value and for receiving a second output signal from the multiplication module, wherein the output terminal of the first register means is connected to the first input unit of the multiplication module, and the output terminal of the second register means is connected to the second input unit of the multiplication module, and wherein the second register means provides the multiplicative inverse of the first initial value in accordance with the first, second and third control signals.

According to a third aspect of the invention, the first and the second register means respectively receive the first initial value and the second initial value. And when the cycle count reaches a predetermined number k (k is a natural number), the control means receives a first control signal for permitting the first power arithmetic means to calculate s powers using $r=2^{k-1}$ and $s=2^r$, and a second control signal for permitting the second power arithmetic means to calculate s powers using $r=\{(m-1)\mod(2^{k-1})\}+1$ and $s=2^r$. The selection means of the multiplication means receives a third control signal according to which, when bit k−1 in the binary expression for (m−1) is 1, the output of the second power multiplication means is transmitted to the input terminal of the second register means, and according to which, when bit k−1 in the binary expression for (m−1) is not 1, the output of the second register means is transmitted to the input terminal of the second register means.

According to a fourth aspect of the invention, a multiplicative inverse arithmetic circuit comprises: two multiplication modules according to the first aspect; first register means for setting a first initial value; and second register means for setting a second initial value, wherein a first output of one of the multiplication modules is connected to the first input unit of the other multiplication module, and a second output of one of the multiplication modules is connected to the second input unit of the other multiplication module, and wherein, for a circuit formed by connecting the multiplication modules, the output terminal of the first register means is connected to the first input units of the multiplication modules, the output terminal of the second register means is connected to the second input units of the multiplication modules, the input terminal of the first register means is connected to the first output units of the multiplication modules, and the input terminal of the second register means is connected to the second output units of the multiplication modules.

According to a fifth aspect of the invention, a multiplicative inverse arithmetic circuit comprises: at least three multiplication modules according to the first aspect; first register means for setting a first initial value; and second register means for setting a second initial value, wherein a first output of one of the multiplication modules is connected to the first input unit of the other multiplication module, and a second output of one of the multiplication modules is connected to the second input unit of the other multiplication module, and wherein, for a circuit formed by connecting the multiplication modules, the output terminal of the first register means is connected to the first input units of the multiplication modules, the output terminal of the second register means is connected to the second input units of the multiplication modules, the input terminal of the first register means is connected to the first output units of the multiplication modules, and the input terminal of the second register means is connected to the second output units of the multiplication modules.

According to a sixth aspect of the invention, a multiplicative inverse arithmetic circuit is provided wherein the number n (n is a natural number) of the multiplication modules is set equal to or smaller than $[\log_2(m-1)+1]$.

According to a seventh aspect of the invention, when the cycle count reaches a predetermined number q (q is a natural number), the control means transmits to the i-th ($n \geq i \geq 1$) multiplication module a first control signal, which permits the first power arithmetic means to calculate s powers using $r=2^{p-1}$ and $s=2^r$, and a second control signal, which permits the second power arithmetic means to calculate s powers using $r=\{(m-1)\mod(2^{p-1})\}+1$ and $s=2^r$, while $p=\{n(q-1)+i\}$. The selection means of the i-th multiplication module receives a third control signal according to which, when bit p−1 in the binary expression (m−1) is 1, the output of the second power multiplication means is transmitted to the second output terminal of the i-th multiplication module, and when bit p−1 in the binary expression (m−1) is not 1, m bit data for the second input unit of the i-th multiplication module is transmitted to the second output terminal of the i-th multiplication module.

According to an eighth aspect of the invention, a multiplicative inverse arithmetic circuit comprises: $[\log_2(m-1)+1]$ multiplication modules according to the first aspect; and control means, for providing a first control signal group, a second control signal group and a third control signal group for respectively controlling the multiplication modules, wherein the first output terminal of each of the multiplication modules is connected to the first input terminal of a succeeding multiplication module, and the second output terminal of each of the multiplication modules is connected to the second input terminal of a succeeding multiplication module, and wherein the control means provides for first power arithmetic means a first control signal for permitting a k-th (k is a natural number) multiplication module to calculate s powers using $r=2^{k-1}$ and $s=2^r$, provides for second power arithmetic means a second control signal for permitting the k-th multiplication module to calculate s powers using $r=\{(m-1)\mod(2^{k-1})\}+1$ and $s=2^r$, provides the output of the second multiplication means as the output of selection means, when bit k−1 in binary expression of m−1 is 1, and provides, as the output of the selection means, m bits of data received from the second input unit when the bit k−1 in the binary expression m−1 is not 1.

According to a ninth aspect of the invention, a multiplicative inverse arithmetic circuit further comprises: a pair of register means connected to the multiplication means.

According to a tenth aspect of the invention, a method for controlling a multiplication module, including a first input unit and a second input unit, for multiplying m bits of data in a Galois field $GF(2^m)$ ($m \geq 1$), comprises the steps of: inputting the first m bits of data from the first input unit to first and second power arithmetic means; inputting, to first multiplication means, the first m bits of data and the output of the first power arithmetic means; inputting, to second multiplication means, second m bits of data from the second input unit and the output of the second power arithmetic means; inputting, to selection means, an output signal from the second multiplication means and the second m bits of data; and outputting a control signal to the first multiplication means, the second multiplication means and the selection means, wherein the first power arithmetic means receives a first control signal, the second power arithmetic means receives a second control signal, and the selection means receives a third control signal, for controlling the output of the selection means, while the first multiplication means outputs a first output signal, and the selection means outputs a second output signal.

According to an eleventh aspect of the invention, a method for controlling a multiplicative inverse arithmetic circuit comprises the steps of: providing a multiplication module according to the first aspect; providing a first register means for setting a first initial value and for receiving a first output signal from the multiplication module; and providing second register means for setting a second initial value and for receiving a second output signal from the multiplication module, wherein the output terminal of the first register means is connected to the first input unit of the multiplication module, and the output terminal of the second register means is connected to the second input unit of the multiplication module, and wherein the second register means provides the multiplicative inverse of the first initial value in accordance with the first, second and third control signals.

According to a twelfth aspect of the invention, a method for controlling a multiplicative inverse arithmetic circuit further comprises the steps of: receiving the first initial value and the second initial value; when the cycle count reaches a predetermined number k (k is a natural number), receiving a first control signal for permitting the first power arithmetic means to calculate s powers using $r=2^{k-1}$ and $s=2^r$, and a second control signal for permitting the second power arithmetic means to calculate s powers using $r=\{(m-1)\mod(2^{k-1})\}+1$ and $s=2^r$; inputting, to the selection means of the multiplication module, a third control signal according to which, when bit k−1 in the binary expression for (m−1) is 1, the output of the second power multiplication means is transmitted to the input terminal of the second register means, and according to which, when bit k−1 in the binary expression for (m−1) is not 1, the output of the second register means is transmitted to the input terminal of the second register means.

According to a thirteenth aspect of the invention, provided is a method for controlling a multiplicative inverse arithmetic circuit that includes two multiplication modules according to the first aspect, first register means for setting a first initial value, and second register means for setting a second initial value, wherein a first output of one of the multiplication modules is connected to the first input unit of the other multiplication module, and a second output of one of the multiplication modules is connected to the second input unit of the other multiplication module, the method comprising the steps of: for a circuit formed by connecting the multiplication modules, connecting the output terminal of the first register means to the first input units of the multiplication modules; and connecting the output terminal of the second register means to the second input units of the multiplication modules.

According to a fourteenth aspect of the invention, provided is a method for controlling a multiplicative inverse arithmetic circuit that includes at least three multiplication modules according to the first aspect, first register means for setting a first initial value, and second register means for setting a second initial value, wherein a first output of one of the multiplication modules is connected to the first input unit of the other multiplication module, and wherein a second output of one of the multiplication modules is connected to the second input unit of the other multiplication module, the method comprising the steps of: for a circuit formed by connecting the multiplication modules, connecting the output terminal of the first register means to the first input units of the multiplication modules; and connecting the output terminal of the second register means to the second input units of the multiplication modules.

According to a fifteenth aspect of the invention, a method for controlling a multiplicative inverse arithmetic circuit is provided wherein the number n (n is a natural number) of the multiplication modules is set equal to or smaller than $[\log_2(m-1)+1]$.

According to a sixteenth aspect of the invention, a method for controlling a multiplicative inverse arithmetic circuit further comprises the steps of: when the cycle count reaches a predetermined number q (q is a natural number), transmitting, to the i-th ($n \geq i \geq 1$) multiplication module, a first control signal, which permits the first power arithmetic means to calculate s powers using $r=2^{p-1}$ and $s=2^r$, and a second control signal, which permits the second power arithmetic means to calculate s powers using $r=\{(m-1)\mod(2^{p-1})\}+1$ and $s=2^r$, while $p=\{n(q-1)+i\}$; and transmitting, to the selection means of the i-th multiplication module, a third control signal according to which, when bit p−1 in the binary expression (m−1) is 1, the output of the second multiplication means is transmitted to the second output terminal of the i-th multiplication module, and when bit p−1 in the binary expression (m−1) is not 1, m bit data for the second input unit of the i-th multiplication module is transmitted to the second output terminal of the i-th multiplication module.

According to a seventeenth aspect of the invention, a method for controlling a multiplicative inverse arithmetic circuit comprises the steps of: providing $[\log_2(m-1)+1]$ multiplication modules according to the first aspect; and providing a first control signal group, a second control signal group and a third control signal group for respectively controlling the multiplication modules, with the first output terminal of each of the multiplication modules being connected to the first input terminal of a succeeding multiplication module, and the second output terminal of each of the multiplication modules being connected to the second input terminal of a succeeding multiplication module, providing, for first power arithmetic means, a first control signal for permitting a k-th (k is a natural number) multiplication module to calculate s powers using $r=2^{k-1}$ and $s=2^r$; providing, for second power arithmetic means, a second control signal for permitting the k-th multiplication module to calculate s powers using $r=\{(m-1)\mod(2^{k-1})\}+1$ and $s=2^r$; providing the output of the second multiplication means as the output of selection means, when bit k−1 in binary expression of m−1 is 1; and providing, as the output of the selection means, m bits of data received from the second input unit when the bit k−1 in the binary expression m−1 is not 1.

According to an eighteenth aspect of the invention, a method for controlling a multiplicative inverse arithmetic circuit further comprises the step of: transmitting the output from the multiplication module to a pair of register means.

According to a nineteenth aspect of the invention, provided is an apparatus employing a multiplication module, including a first input unit and a second input unit, for multiplying m bits of data in a Galois field $GF(2^m)(m \geq 1)$ the multiplication module comprising: first and second power arithmetic means for receiving the first m bits of data from the first input unit; first multiplication means for receiving the first m bits of data and the output of the first power arithmetic means; second multiplication means for receiving second m bits of data from the second input unit and the output of the second power arithmetic means; selection means for receiving an output signal from the second multiplication means and the second m bits of data; and control circuit for outputting a control signal to the first power arithmetic means, the second power arithmetic means and the selection means, wherein the first power arithmetic means receives a first control signal, the second power arithmetic means receives a second control signal, and the selection means receives a third control signal, for controlling the output of the selection means, while the first multiplication means outputs a first output signal, and the selection means outputs a second output signal.

According to a twentieth aspect of the invention, provided is an apparatus including a multiplicative inverse arithmetic circuit that comprises: the multiplication module according to the first aspect; first register means for setting a first initial value and for receiving a first output signal from the multiplication module; and second register means for setting a second initial value and for receiving a second output signal from the multiplication module, wherein the output terminal of the first register means is connected to the first input unit of the multiplication module, and the output terminal of the second register means is connected to the second input unit of the multiplication module, and wherein the second register means provides the multiplicative inverse of the first initial value in accordance with the first, second and third control signals.

According to a twenty-first aspect of the invention, the first and the second register means respectively receive the first initial value and the second initial value. And when the cycle count reaches a predetermined number k (k is a natural number), the control means receives a first control signal for permitting the first power arithmetic means to calculate s powers using $r=2^{k-1}$ and $s=2^r$, and a second control signal for permitting the second power arithmetic means to calculate s powers using r={(m−1)mod ($2^{k-1}$)}+1 and s=$2^r$. The selection means of the multiplication means receives a third control signal according to which, when bit k−1 in the binary expression for (m−1) is 1, the output of the second multiplication means is transmitted to the input terminal of the second register means, and according to which, when bit k−1 in the binary expression for (m−1) is not 1, the output of the second register means is transmitted to the input terminal of the second register means.

According to a twenty-second aspect of the invention, provided is an apparatus including a multiplicative inverse arithmetic circuit that comprises: two multiplication modules according to the first aspect; first register means for setting a first initial value; and second register means for setting a second initial value, wherein a first output of one of the multiplication modules is connected to the first input unit of the other multiplication module, and a second output of one of the multiplication modules is connected to the second input unit of the other multiplication module, and wherein, for a circuit formed by connecting the multiplication modules, the output terminal of the first register means is connected to the first input units of the multiplication means, the output terminal of the second register means is connected to the second input units of the multiplication modules, the input terminal of the first register means is connected to the first output units of the multiplication means, and the input terminal of the second register means is connected to the second output units of the multiplication modules.

According to a twenty-third aspect of the invention, provided is an apparatus including a multiplicative inverse arithmetic circuit that comprises: at least three multiplication modules according to the first aspect; first register means for setting a first initial value; and second register means for setting a second initial value, wherein a first output of one of the multiplication modules is connected to the first input unit of the other multiplication module, and a second output of one of the multiplication modules is connected to the second input unit of the other multiplication module, and wherein, for a circuit formed by connecting the multiplication modules, the output terminal of the first register means is connected to the first input units of the multiplication modules, the output terminal of the second register means is connected to the second input units of the multiplication modules, the input terminal of the first register means is connected to the first output units of the multiplication means, and the input terminal of the second register means is connected to the second output units of the multiplication modules.

According to a twenty-fourth aspect of the invention, provided is an apparatus that includes a multiplicative inverse arithmetic circuit is provided wherein the number n (n is a natural number) of the multiplication modules is set equal to or smaller than [$\log_2$(m−1)+1].

According to a twenty-fifth aspect of the invention, when the cycle count reaches a predetermined number q (q is a natural number), the control means transmits to the i-th (n≧i≧1) multiplication module a first control signal, which permits the first power arithmetic means to calculate s powers using r=$2^{p-1}$ and s=$2^r$, and a second control signal, which permits the second power arithmetic means to calculate s powers using r={(m−1)mod($2^{p-1}$)}+1 and s=$2^r$, while p={n(q−1)+i}. The selection means of the i-th multiplication module receives a third control signal according to which, when bit p−1 in the binary expression (m−1) is 1, the output of the second multiplication means is transmitted to the second output terminal of the i-th multiplication module, and when bit p−1 in the binary expression (m−1) is not 1, m bit data for the second input unit of the i-th multiplication module is transmitted to the second output terminal of the i-th multiplication module.

According to a twenty-sixth aspect of the invention, provided is an apparatus including a multiplicative inverse arithmetic circuit that comprises: [$\log_2$(m−1)+1] multiplication modules according to the first aspect; and control means, for providing a first control signal group, a second control signal group and a third control signal group for respectively controlling the multiplication modules, wherein the first output terminal of each of the multiplication modules is connected to the first input terminal of a succeeding multiplication module, and the second output terminal of each of the multiplication modules is connected to the second input terminal of a succeeding multiplication module, and wherein the control means provides for first power arithmetic means a first control signal for permitting a k-th (k is a natural number) multiplication module to calculate s powers using r=$2^{k-1}$ and s=$2^r$, provides for second power arithmetic means a second control signal for permitting the k-th multiplication module to calculate s powers using r={(m−1) mod($2^{k-1}$)}+1 and s=$2^r$, provides the output of the second multiplication means as the output of selection means, when bit k−1 in binary expression of m−1 is 1, and provides, as the output of the selection means, m bits of data received from the second input unit when the bit k−1 in the binary expression m−1 is not 1.

According to a twenty-seventh aspect of the invention, provided is an apparatus including a multiplicative inverse arithmetic circuit that further comprises: a pair of register means connected to the multiplication means.

According to a twenty-eighth aspect of the invention, a method for controlling a multiplicative inverse arithmetic circuit comprises the steps of: transmitting, to multiplication means, m bits of data from a first input unit and the output of power arithmetic means in order to multiply the m bits of data in a Galois field GF($2^m$)(m≧1); transmitting, to multiplication means, m bits of data from a second input unit and the output of the power arithmetic means; transmitting a first control signal, which permits the first power arithmetic means to calculate s powers using r=$2^{p-1}$ and s=$2^r$, and a second control signal, which permits the second power arithmetic means to calculate s powers using r={(m−1)mod($2^{p-1}$)}+1 and s=$2^r$, while p={n(q−1)+i}; and providing the output of the second multiplication means as the output of selection means, when bit k−1 in binary expression of m−1 is 1, and providing, as the output of the selection means, m bits of data received from the second input unit when the bit k−1 in the binary expression m−1 is not 1.

According to a twenty-ninth aspect of the invention, provided is a computer-readable recording medium on which source code is recorded that permits a computer to execute a multiplication method comprising the steps of: transmitting, to multiplication means, m bits of data from a first input unit and the output of power arithmetic means in order to multiply the m bits of data in a Galois field GF($2^m$)(m≧1); transmitting, to multiplication means, m bits of data from a second input unit and the output of the power arithmetic means; transmitting a first control signal, which permits the first power arithmetic means to calculate s powers using r=$2^{p-1}$ and s=$2^r$, and a second control signal, which permits the second power arithmetic means to calculate s powers using r={(m−1)mod($2^{p-1}$)}+1 and s=$2^r$, while p={n(q−1)+i}; and providing the output of the second multiplication means as the output of selection means, when bit k−1 in binary expression of m−1 is 1, and providing, as the output of the selection means, m bits of data received from the second input unit when the bit k−1 in the binary expression m−1 is not 1.

According to a thirtieth aspect of the invention, provided is a computer-readable transfer medium on which source code is recorded that permits a computer to execute a multiplication method comprising the steps of: transmitting, to multiplication means, m bits of data from a first input unit and the output of power arithmetic means in order to multiply the m bits of data in a Galois field $GF(2^m)(m \geq 1)$; transmitting, to multiplication means, m bits of data from a second input unit and the output of the power arithmetic means; transmitting a first control signal, which permits the first power arithmetic means to calculate s powers using $r=2^{p-1}$ and $s=2^r$, and a second control signal, which permits the second power arithmetic means to calculate s powers using $r=\{(m-1)mod(2^{p-1})\}+1$ and $s=2^r$, while $p=\{n(q-1)+i\}$; and providing the output of the second multiplication means as the output of selection means, when bit k−1 in binary expression of m−1 is 1, and providing, as the output of the selection means, m bits of data received from the second input unit when the bit k−1 in the binary expression m−1 is not 1.

According to a thirty-first aspect of the invention, a cryptographic apparatus comprises: multiplication means for receiving m bits of data from a first input unit and the output of power arithmetic means in order to multiply the m bits of data in a Galois field $GF(2^m)(m \geq 1)$; multiplication means for receiving m bits of data from a second input unit and the output of the power arithmetic means; means for transmitting, to a first power arithmetic means, a first control signal that permits the first power arithmetic means to calculate s powers using $r=2^{p-1}$ and $s=2^r$, and for transmitting, to a second power arithmetic means, a second control signal that permits the second power arithmetic means to calculate s powers using $r=\{(m-1)mod(2^{p-1})\}+1$ and $s=2^r$, while $p=\{n(q-1)+I\}$; and means for providing the output of the second multiplication means as the output of selection means, when bit k−1 in binary expression of m−1 is 1, and providing, as the output of the selection means, m bits of data received from the second input unit when the bit k−1 in the binary expression m−1 is not 1.

According to a thirty-second aspect of the invention, an error correction decoder comprises: multiplication means for receiving m bits of data from a first input unit and the output of power arithmetic means in order to multiply the m bits of data in a Galois field $GF(2^m)(m \geq 1)$; multiplication means for receiving m bits of data from a second input unit and the output of the power arithmetic means; means for transmitting, to a first power arithmetic means, a first control signal that permits the first power arithmetic means to calculate s powers using $r=2^{p-1}$ and $s=2^r$, and for transmitting, to a second power arithmetic means, a second control signal that permits the second power arithmetic means to calculate s powers using $r=\{(m-1)mod(2^{p-1})\}+1$ and $s=2^r$, while $p=\{n(q-1)+i\}$; and means for providing the output of the second multiplication means as the output of selection means, when bit k−1 in binary expression of m−1 is 1, and providing, as the output of the selection means, m bits of data received from the second input unit when the bit k−1 in the binary expression m−1 is not 1.

According to a thirty-third aspect of the invention, an apparatus comprises: multiplication means for receiving m bits of data from a first input unit and the output of power arithmetic means in order to multiply the m bits of data in a Galois field $GF(2^m)(m \geq 1)$; multiplication means for receiving m bits of data from a second input unit and the output of the power arithmetic means; means for transmitting, to a first power arithmetic means, a first control signal that permits the first power arithmetic means to calculate s powers using $r=2^{p-1}$ and $s=2^r$, and for transmitting, to a second power arithmetic means, a second control signal that permits the second power arithmetic means to calculate s powers using $r=\{(m-1)mod(2^{p-1})\}+1$ and $s=2^r$, while $p=\{n(q-1)+i\}$; and means for providing the output of the second multiplication means as the output of selection means, when bit k−1 in binary expression of m−1 is 1, and providing, as the output of the selection means, m bits of data received from the second input unit when the bit k−1 in the binary expression m−1 is not 1.

BRIEF DESCRIPTION OF THE DRAWINGS

FIG. 8 is a diagram showing pseudo code for providing control signals used for the invention.

DESCRIPTION OF THE PREFERRED EMBODIMENTS

The preferred embodiment of the present invention will now be described while referring to the accompanying drawings. In this invention, Hw(x) denotes a Hamming weight in the binary expression of x, [x] denotes the integer of x (the number obtained by omitting the decimals), a denotes the root of the irreducible polynomial $GF(2^m)$, $a^0$ denotes 1 in $GF(2^m)$, and M denotes the latency of a multiplier. Further, the period extending from the time the values for registers R1 and R2 are set, which will be described later, until the values are set the next time is defined as one cycle.

Figure 1:
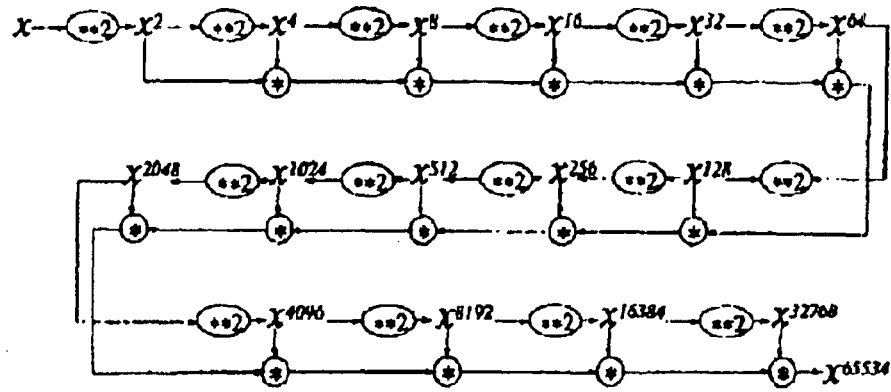
FIG. 1 is a diagram showing a conventional algorithm for multiplicative inverse arithmetic using Fermat's little theorem.
Figure 2:
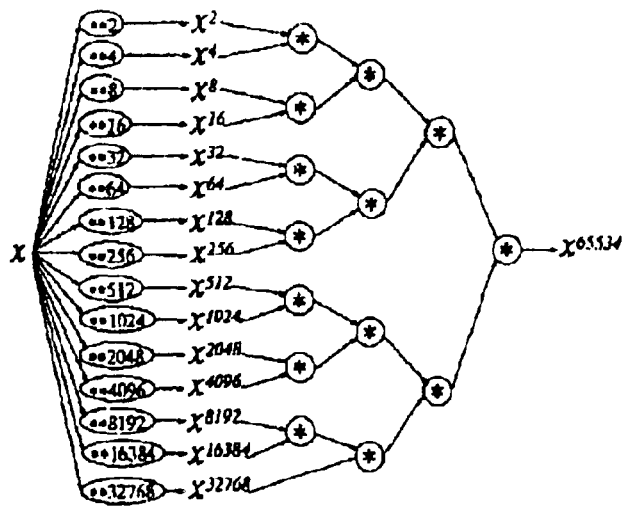
FIG. 2 is a diagram showing a conventional algorithm for multiplicative inverse arithmetic using a tree structure.
Figure 3:
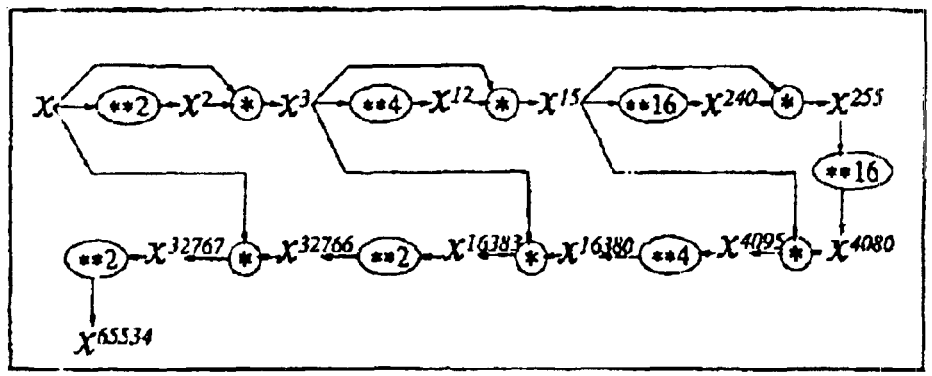
FIG. 3 is a diagram showing the conventional algorithm for multiplicative inverse arithmetic.
Figure 4:
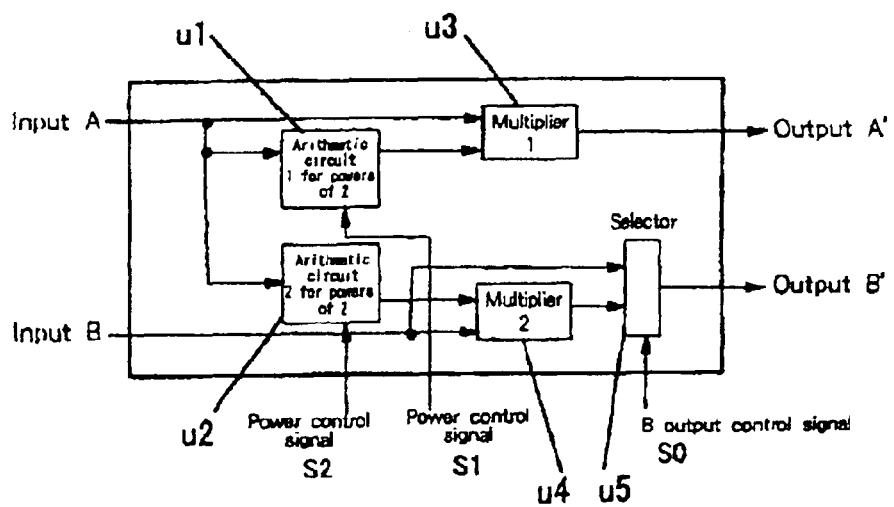
FIG. 4 is a diagram showing a multiplication module according to one embodiment.
Figure 5:
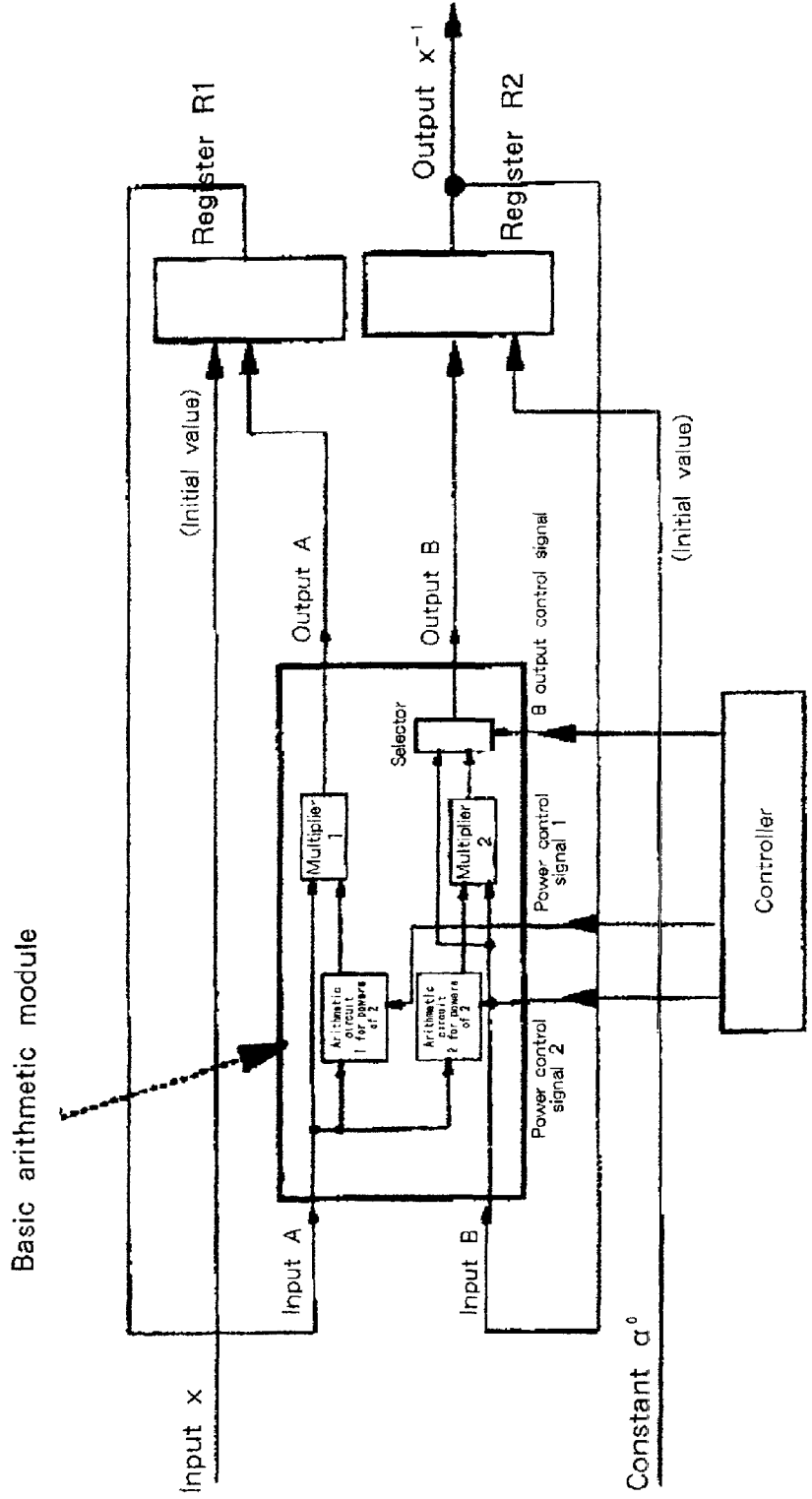
FIG. 5 is a diagram showing a multiplicative inverse arithmetic circuit according to the invention.
Figure 6:
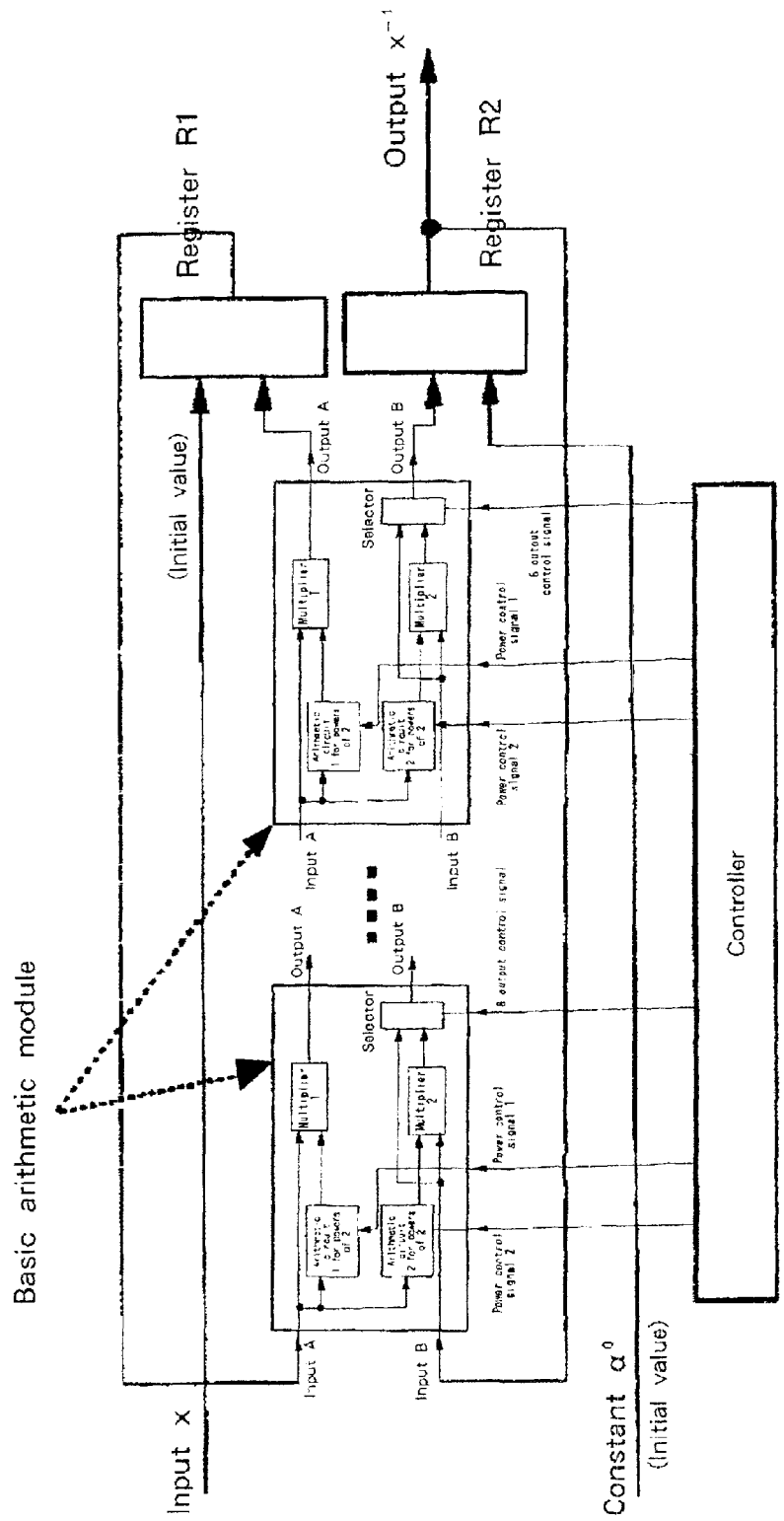
FIG. 6 is a diagram showing another example multiplicative inverse arithmetic circuit according to the embodiment of the present invention.
Figure 7:
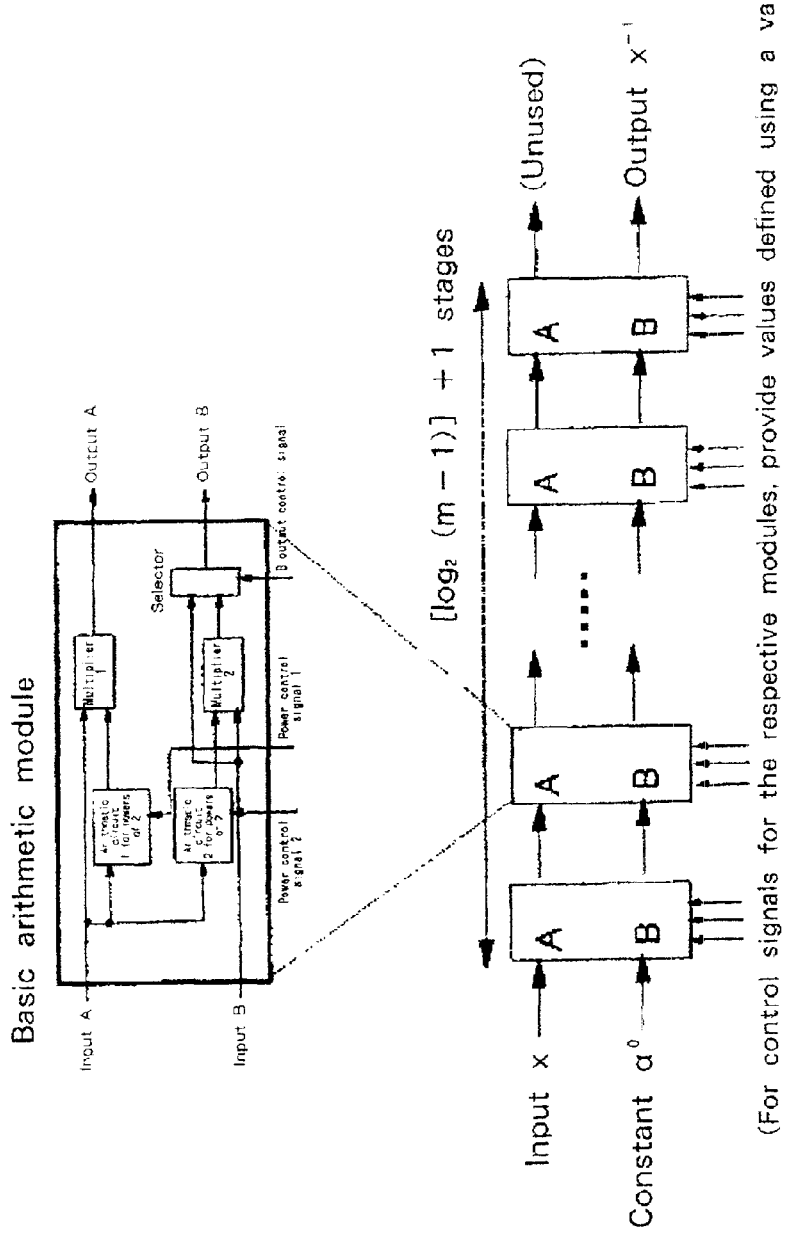
FIG. 7 is a diagram showing an additional example multiplicative inverse arithmetic circuit according to the embodiment of the present invention.
Figure 12:
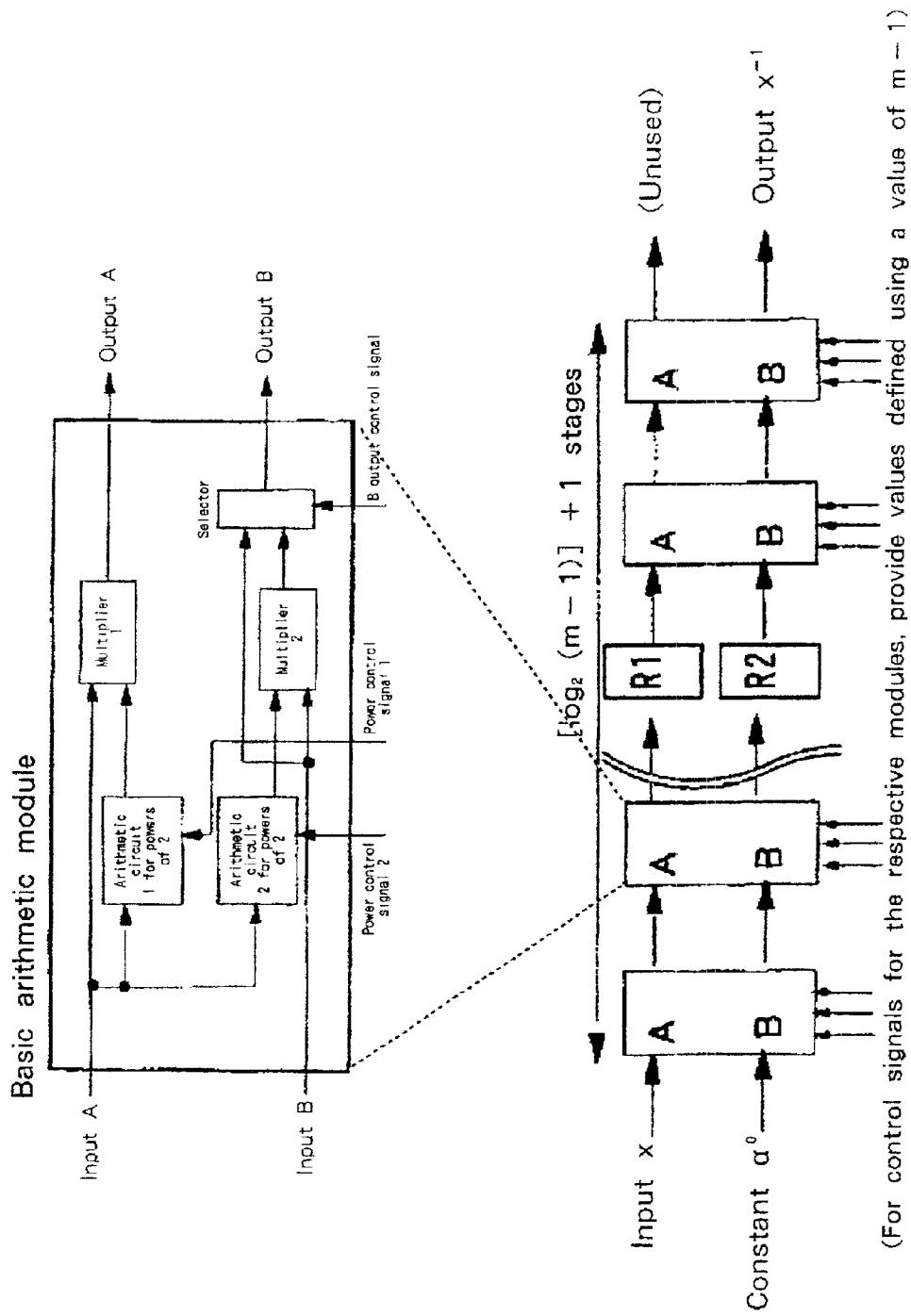
FIG. 12 is a diagram showing a further example wherein additional registers are provided for the multiplicative inverse arithmetic circuit in FIG. 7.

When by using the multiplication module (basic arithmetic module) in FIG. 4 the multiplicative inverse arithmetic circuit is constituted as a sequential circuit, the circuit shown in either FIG. 5 or 6 is obtained. And when the multiplicative inverse arithmetic circuit is constituted as a combinational circuit, the circuit shown in FIG. 7 is obtained. Control signals, specifically those shown in FIG. 6, which will be described later, are transmitted to the basic modules in FIGS. 5 to 7, as is shown in FIG. 8. And as is shown in FIG. 12, the basic arithmetic modules can be sequentially arranged, like a pipe line.

The basic multiplication modules includes two multipliers, two arithmetic circuits, for the powers of 2 (for performing $2^k$ power calculation), and a selector having an output B. In each power calculation circuit, k is provided externally as a module control signal (FIG. 4). When the multiplicative inverse arithmetic circuit is formed as a sequential circuit (FIGS. 5 and 6), at least one multiplication module is employed, as shown in FIG. 4, and its output terminal is connected to the registers. For this purpose, registers should be employed for which externally provided initial values can be set. The register outputs are fed back to the input terminal of the multiplication module group. The multiplication module and the selector are controlled by special control means, such as a controller, which generates control signals in accordance with the procedures shown in FIG. 8.

An explanation will now be given for an example wherein the algorithm in FIG. 8 is mounted as a circuit. The data flow graph obtained from the algorithm is used for mounting the circuit. And when each part is constituted by the combinational circuit and the entire data flow graph has been statically mapped into a circuit, the combinational circuit can be obtained, or when resource allocation and scheduling are performed, the sequential circuit can be obtained. When the sequential circuit is formed, parallel input/output is not always required for the multiplication and power arithmetic.

In the above algorithm, there is a portion where it seems that remainder calculation is performed, like $$(m-1) \bmod (2^{k-1})$$ [Expression 10]

This is actually an operation for extracting the lower k−1 bits in the binary expression m−1, and can be implemented by using extremely simple hardware (when a combinational circuit is constituted, these are constant values, so that the circuit can be simplified by being calculated in advance). Further, since calculation of the powers of 2 can be implemented by employing a simple circuit, basically, the only costs involved are those for the required multiplier and registers.

It is easy, when an algorithm is formed as a sequential circuit, for m to be dynamically changed. Two registers, R1 and R2, are employed, regardless of the value of m, and depending on the value of m, the roles of the registers do not vary. Substantially, only the changing of the number of loops and the number of powers for the power arithmetic depend on the value of m, the structure of a data path does not. In order to control the data path, the power number $$\{(m-1) \bmod (2^{k-1})+1\}$$ [Expression 11]

must be dynamically introduced using m. However, this is extremely easy, and as is shown above, the bits need only be extracted from the binary expression m−1.

When the algorithm is provided as the combinational circuit (FIG. 7), $$[\log_2(m-1)]+1$$ [Expression 12]

units of the basic modules in FIG. 4 are connected in series, and the control signals for the individual modules are transmitted in accordance with the procedures in FIG. 8.

Since the control signals have fixed values established by stabilizing the value of m, the logic can be simplified, and it should be noted that a circuit that can cope with an arbitrary value for m may be constituted by holding m in another register and by decoding a control signal in the register.

In addition, n multiplication modules are connected in series, with the value of n falling within the range $$[\log_2(m-1)+1]n1,$$ [Expression 13]

and as in FIG. 5, the register and the controller for each module are additionally provided to form a modification circuit like that in FIG. 5 (FIG. 6). At the q-th (q is a natural number) cycle, the $\{n(q-1)+i\}$-th cycle control signal in FIG. 8 is transmitted to the control input terminal of the i-th ($n \geq i \geq 1$) module. For example, when three multiplication modules are connected in series, for each cycle, the first, the fourth, the seventh, . . . , the control signals in FIG. 8 are transmitted to the first module, while the second, the fifth, the eighth, . . . cycle control signals are transmitted to the second module, and the third, the sixth, the ninth, . . . cycle control signals are transmitted to the third module.

The present invention includes all the circuits obtained by deleting the redundancy logic from the circuits in FIGS. 4, 5, 6, 7 and 12. Especially, the multiplier that receives the constant $a^0$ at one of the input terminals is deleted, and the other input terminal is connected to the output terminal of the multiplier. Further, the power arithmetic circuit whose output is not used and the selector that has a fixed output are also deleted. In addition, in FIG. 4, the multiplier and the power arithmetic circuit need not always be combinational circuits.

Figure 9:
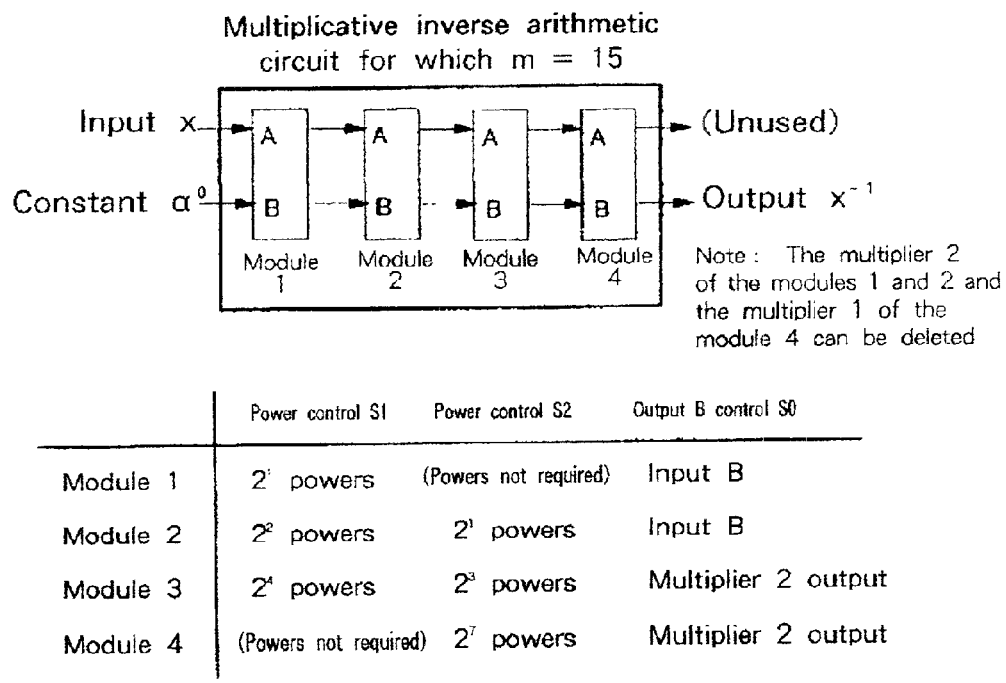
FIG. 9 is a diagram showing control signals used for the invention.

FIG. 9 is a diagram showing control signals that are actually transmitted to the module while using the combinational circuit in which m=15.

When m=15, four basic modules are connected in series, and module numbers 1, 2, 3 and 4 are provided beginning on the input side. At this time, as is shown in FIG. 9, the following control signals are transmitted, for example, to module 2:

a signal that permits a power arithmetic circuit 1 to calculate 4 powers of its input.

a signal that permits a power arithmetic circuit 2 to calculate squares.

a signal that permits a selector to output the value of input B to the output terminal B.

The same thing applies for the other modules. In this case, since the multipliers 2 of the modules 1 and 2, the multiplier 1 of the module 4, the power arithmetic circuit 2 of the module 1, and the power arithmetic circuit 1 of the module 4 are not necessary, these are deleted, and the resultant circuit is employed.

When m=15 and the sequential circuit in FIG. 5 are provided, four cycles are required for the initialization of the registers and the completion of the process. The same control signals as those transmitted to the modules 1 to 4 in FIG. 9 are generated by a power register input control signal generator in FIG. 5, and are transmitted, in the named order, to the basic circuit module. These control signals are generated by the power register input control signal generator in FIG. 5.

For the other m, the connection and the control for the basic modules are performed in the same manner.

(1) When the Modules are Mounted as the Sequential Circuit Shown in FIG. 5

The cycle count required for the calculation is, relative to an arbitrary m,

Fermat's little theorem: m−2
Itoh:[$\log_2$(m−1)]+Hw(m−1)−1
The invention: [$\log_2$(m−1)]+1

Figure 10:
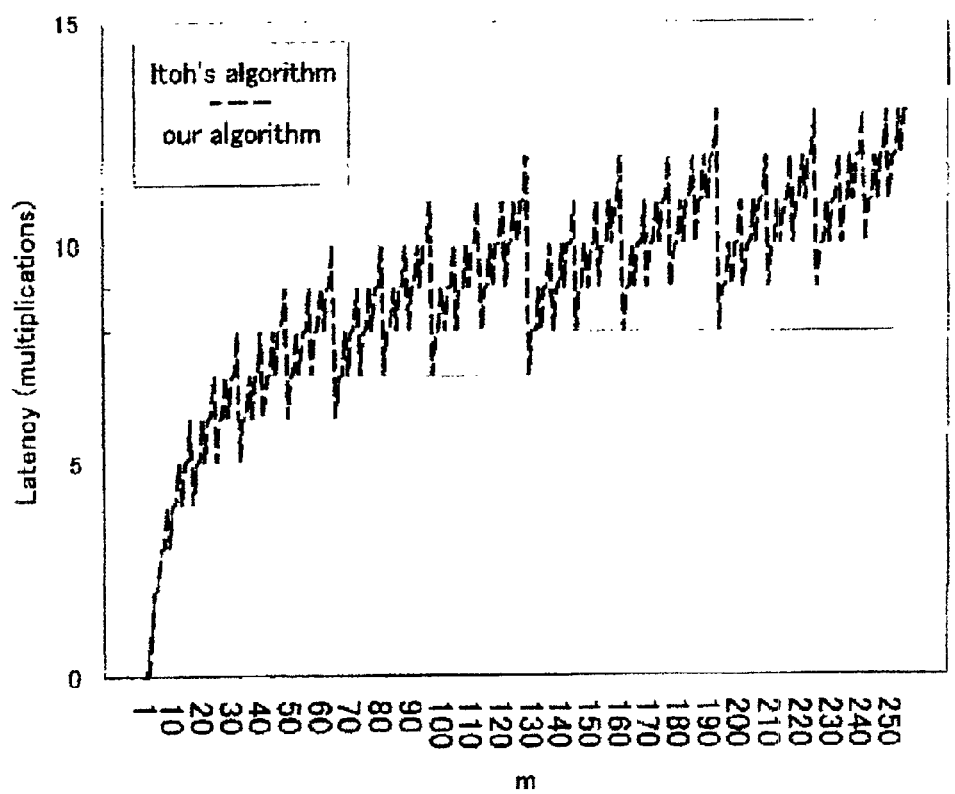
FIG. 10 is a diagram showing a comparison of the latency between the algorithm of the invention and a conventional algorithm.

The cycle count for the invention is the smallest, and at its maximum, is about half the cycle count required for Itoh. When, for example, m=192,
Fermat's little theorem: 190
Itoh:13
The invention: 8
And when m=511,
Fermat's little theorem: 509
Itoh:15
The invention: 9
As is apparent, the latency is greatly improved.
(2) When the Modules are Mounted as the Combinational Circuits in FIG. 7
The number of multipliers (circuit size), relative to an arbitrary m, is
Fermat's little theorem: m−2
Itoh: $[\log_2(m-1)]+Hw(m-1)-1$
The invention: $[\log_2(m-1)]+Hw(m-1)-1$
Thus, the method of Itoh and the method of this invention are the best.
For latency (speed),
Fermat's little theorem: $\{[\log_2(m-2)]+1\}$*the latency of the multiplier
Itoh: $\{[\log_2(m-1)]+Hw(m-1)-1\}$*the latency of the multiplier
The invention: $\{[\log_2(m-2)]+1\}$*the latency of the multiplier
Thus, the method of Fermat's little theorem and the method of the invention are the best. The difference between the latencies for the algorithm for Itoh and for the invention is shown in the graph in FIG. 10.

Figure 11:
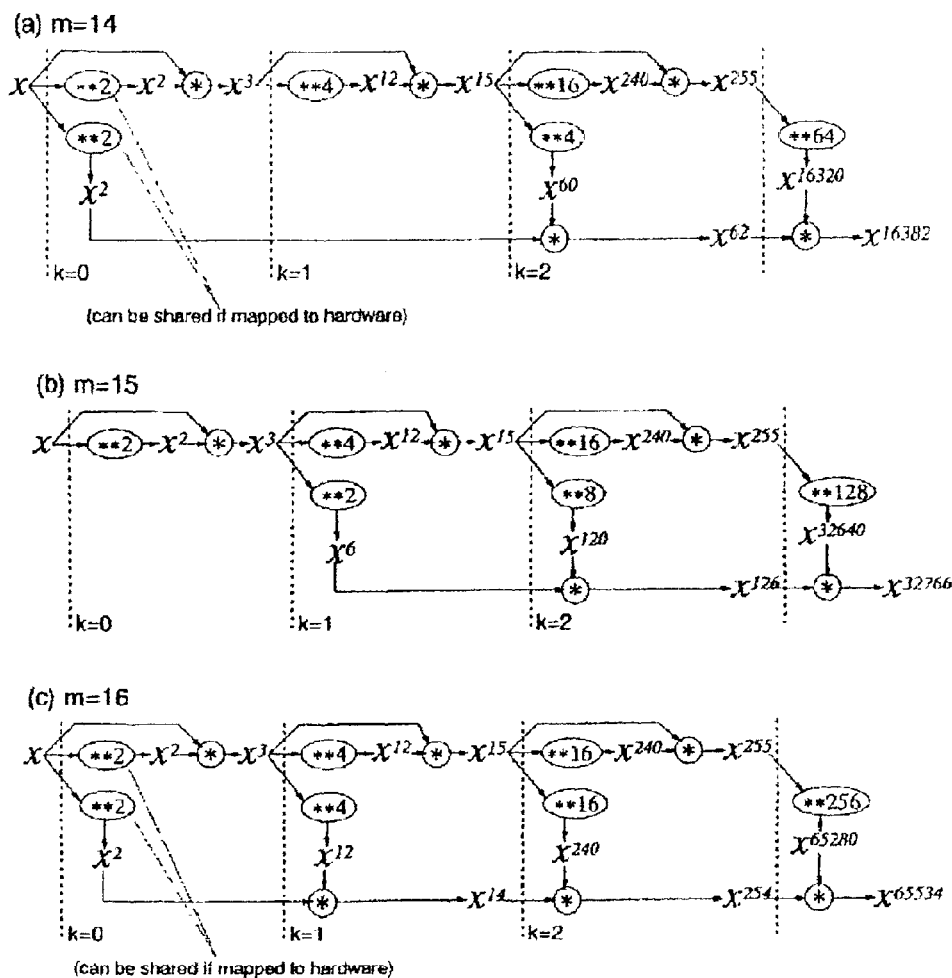
FIG. 11 is a diagram showing a data flow graph and scheduling using the algorithm of the invention.

In conclusion, according to the method of the invention, the latency can be reduced to approximately half (=Fermat's little theorem) that of Itoh, while the circuit size that is maintained is the same as that of Itoh and is considerably smaller than that of Fermat's little theorem. Further, as is shown in the lower portion in FIG. 6, even when a real circuit is made by using the general-purpose logic synthesizer, the difference in the algorithms appears directly in the number of gates and the speed. In FIGS. 11A to 11C, data flow graphs are shown for the invention when m=14, 15 and 16.

FIG. 12 is a diagram showing another example multiplicative inverse arithmetic circuit according to the present invention. In the multiplicative inverse arithmetic circuit in FIG. 12, registers R1 and R2 are additionally provided for the configuration in FIG. 7. The paired registers R1 and R2 can be arranged at any of the multiplication module locations that constitute the multiplicative inverse arithmetic circuit in FIG. 12, or an arrangement including an arbitrary number of registers can provided.

As is described above, according to the present invention, when the basic modules are combined, a low latency (a small process clock count for the sequential circuit and a short delay for the combinational circuit) can be achieved, without the number of multiplications being increased.

According to the method of the invention, dynamically changing the value of m (when the method of the invention is mounted as a sequential circuit) is as easy as it is with Fermat's little theorem, while since the number of registers is statically determined to be two, substantially the same data path can be employed with an arbitrary m value, and m can be changed merely by altering the control, such as the number of loops. Further, to dynamically change the control, as was previously mentioned, only a simple circuit need be used. The method of the invention can be applied not only for an inverse calculation, but can also be applied to increase the speed of the power arithmetic.

When the method of the invention is combined with the method in reference document [4] to increase the speed of the composite field based method, the circuit size and the latency can be further reduced. The embodiment has been explained by referring to the drawings of the invention. However, the present invention is not limited to the embodiment, and various modifications, including the removal of some parts or the addition of other modes can be provided. Further, the apparatuses for which the invention can be employed is not limited to cryptographic apparatuses and error decoders, but also includes arbitrary apparatuses that employ a Galois extension field.

What is claimed is:

1. A multiplication module, including a first input unit and a second input unit, for multiplying in bits of data in a Galois field $GF(2^m)(m \geq 1)$, comprising:

first and second power arithmetic means for receiving the first m bits of data from said first input unit;

first multiplication means for receiving said first m bits of data and the output of said first power arithmetic means;

second multiplication means for receiving second in bits of data from said second input unit and the output of said second power arithmetic means;

selection means for receiving an output signal from said second multiplication means and said second in bits of data; and control means for outputting a control signal to said first power arithmetic means, said second arithmetic means and said selection means, wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal.

2. A multiplicative inverse arithmetic circuit comprising:

a multiplication module including a first input unit and a second input unit, for multiplying m bits of data in a Galois field $GF(2^m)(m \geq 1)$, comprising:

first and second power arithmetic means for receiving the first in m bits of data from said first input unit;

first multiplication means for receiving said first in bits of data and the output of said first power arithmetic means;

second multiplication means for receiving second m bits of data from said second input unit and the output of said second power arithmetic means;

selection means for receiving an output signal from said second multiplication means and said second m bits of data; and control means for outputting a control signal to said first power arithmetic means, said second arithmetic means and said selection means, wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal;

first register means for setting a first initial value and for receiving a first output signal from said multiplication module; and second register means for setting a second initial value and for receiving a second output signal from said multiplication module, wherein the output terminal of said first register means is connected to said first input unit of said multiplication module, and the output terminal of said second register means is connected to said second input unit of said multiplication module, and wherein said second register means provides the multiplicative inverse of said first initial value in accordance with said first, second and third control signals.

3. The multiplicative inverse arithmetic circuit according to claim 2, wherein said first and said second register means respectively receive said first initial value and said second initial value; wherein, when the cycle count reaches a predetermined number k (k is a natural number), said control means receives a first control signal for permitting said first power arithmetic means to calculate s powers using $r=2^{k-1}$ and $s=2^r$, and a second control signal for permitting said second power arithmetic means to calculate s powers using $r=\{(m-1)\mod(2^{k-1})\}+1$ and $s=2^r$; and wherein said selection means of said multiplication means receives a third control signal according to which, when bit k−1 in the binary expression for (m−1) is the output of said second power multiplication means is transmitted to the input terminal of said second register means, and according to which, when bit k−1 in the binary expression for (m−1) is not 1, the output of said second register means is transmitted to the input terminal of said second register means.

4. A multiplicative inverse arithmetic circuit comprising:

two multiplication modules each of which includes a first input unit and a second input unit, for multiplying m bits of data in a Galois field $GF(2^m)$ ($m \geq 1$), comprising:
first and second power arithmetic means for receiving the first m bits of data from said first input unit;
first multiplication means for receiving said first m bits of data and the output of said first power arithmetic means;
second multiplication means for receiving second m bits of data from said second input unit and the output of said second power arithmetic means;
selection means for receiving an output signal from said second multiplication means and said second m bits of data: and
control means for outputting a control signal to said first power arithmetic means, said second arithmetic means and said selection means,
wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal;
first register means for setting a first initial value; and
second register means for setting a second initial value,
wherein a first output of one of said multiplication modules is connected to said first input unit of the other multiplication module, and a second output of one of said multiplication modules is connected to said second input unit of the other multiplication module, and
wherein, for a circuit formed by connecting said multiplication modules, the output terminal of said first register means is connected to said first input unit of said multiplication modules, the output terminal of said second register means is connected to said second input unit of said multiplication modules, the input terminal of said first register means is connected to said first output unit of said multiplication modules, and the input terminal of said second register means is connected to said second output unit of said multiplication modules.

5. The multiplicative inverse arithmetic circuit according to claim 4, wherein the number n (n is a natural number) of said multiplication modules is set equal to or smaller than $[\log_2(m-1)+1]$.

6. The multiplicative inverse arithmetic circuit according to claim 4, wherein, when the cycle count reaches a predetermined number q (q is a natural number), said control means transmits to the i-th ($ni \geq i \geq 1$) multiplication module a first control signal, which permits said first power arithmetic means to calculate s powers using $r=2^{p-1}$ and $s=2^r$, and a second control signal, which permits said second power arithmetic means to calculate s powers using $r=\{(m-1)\mod(2^{p-1})\}+1$ and $s32\ 2^r$, while $p=\{n(q-1)+i\}$;

wherein said selection means of said i-th multiplication module receives a third control signal according to which, when bit p−1 in the binary expression (m−1) is 1, the output of said second power multiplication means is transmitted to the second output terminal of said i-th multiplication module, and when bit p−1 in the binary expression (m−1) is not 1, m bit data for said second input unit of said i-th multiplication module is transmitted to the second output terminal of said i-th multiplication module.

7. A multiplicative inverse arithmetic circuit comprising:

at least three multiplication modules each of which includes a first input unit and a second input unit, for multiplying m bits of data in a Galois field $GF(2^m)$ ($m \geq 1$), comprising:
first and second power arithmetic means for receiving the first m bits of data from said first input unit;
first multiplication means for receiving said first m bits of data and the output of said first power arithmetic means;
second multiplication means for receiving second m bits of data from said second input unit and the output of said second power arithmetic means;
selection means for receiving an output signal from said second multiplication means and said second m bits of data; and
control means for outputting a control signal to said first power arithmetic means, said second arithmetic means and said selection means,
wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal;
first register means for setting a first initial value; and
second register means for setting a second initial value,
wherein a first output of one of said multiplication modules is connected to said first input unit of the other multiplication module, and a second output of one of said multiplication modules is connected to said second input unit of the other multiplication module, and
wherein, for a circuit formed by connecting said multiplication modules, the output terminal of said first register means is connected to said first input units of said multiplication modules, the output terminal of said second register means is connected to said second input units of said multiplication modules, the input terminal of said first register means is connected to said first output units of said multiplication modules, and the input terminal of said second register means is connected to said second output units of said multiplication modules.

8. A multiplicative inverse arithmetic circuit comprising: [$\log_2(m-1)+1$] multiplication modules each of which includes a first input unit and a second input unit, for multiplying m bits of data in a Galois field GF($2^m$) ($m \geq 1$), comprising:

first and second power arithmetic means for receiving the first m bits of data from said first input unit;

first multiplication means for receiving said first m bits of data and the output of said first power arithmetic means;

second multiplication means for receiving second m bits of data from said second input unit and the output of said second power arithmetic means;

selection means for receiving an output signal from said second multiplication means and said second m bits of data; and first control means for outputting a control signal to said first power arithmetic means, said second arithmetic means and said selection means, wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal; and second control means, for providing a first control signal group, a second control signal group and a third control signal group for respectively controlling said multiplication modules, wherein the first output terminal of each of said multiplication modules is connected to the first input terminal of a succeeding multiplication module, and the second output terminal of each of said multiplication modules is connected to the second input terminal of a succeeding multiplication module, and wherein said second control means provides for first power arithmetic means a first control signal for permitting a k-th (k is a natural number) multiplication module to calculate s powers using $r=2^{k-1}$ and $s=2^r$, provides for second power arithmetic means a second control signal for permitting said k-th multiplication module to calculate s powers using $r=\{(m-1)\mod(2^{k-1})\}+1$ and $s=2^r$, provides the output of said second multiplication means as the output of selection means, when bit k−1 in binary expression of m−1 is 1, and provides, as the output of said selection means, m bits of data received from said second input unit when said bit k−1 in the binary expression m−1 is not 1.

9. The multiplicative inverse arithmetic circuit according to claim 8, further comprising:

a pair of register means connected to said multiplication means.

10. A method for controlling a multiplication module, including a first input unit and a second input unit, for multiplying m bits of data in a Galois field GF($2^m$)($m \geq 1$), comprising the steps of:

inputting the first m bits of data from said first input unit to first and second power arithmetic means;

inputting, to first multiplication means, said first m bits of data and the output of said first power arithmetic means;

inputting, to second multiplication means, second m bits of data from said second input unit and the output of said second power arithmetic means;

inputting, to selection means, an output signal from said second multiplication means and said second m bits of data; and outputting a control signal to said first multiplication means, said second multiplication means and said selection means, wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal.

11. A method for controlling a multiplicative inverse arithmetic circuit comprising the steps of:

providing a multiplication module including a first input unit and a second input unit, for multiplying m bits of data in a Galois field GF($2^m$)($m \geq 1$), comprising:

first and second power arithmetic means for receiving the first m bits of data from said first input unit;

first multiplication means for receiving said first m bits of data and the output of said first power arithmetic means;

second multiplication means for receiving second m bits of data from said second input unit and the output of said second power arithmetic means;

selection means for receiving an output signal from said second multiplication means and said second m bits of data; and control means for outputting a control signal to said first power arithmetic means, said second arithmetic means and said selection means, wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal;

providing a first register means for setting a first initial value and for receiving a first output signal from said multiplication module; and providing second register means for setting a second initial value and for receiving a second output signal from said multiplication module, wherein the output terminal of said first register means is connected to said first input unit of said multiplication module, and the output terminal of said second register means is connected to said second input unit of said multiplication module, and wherein said second register means provides the multiplicative inverse of said first initial value in accordance with said first, second and third control signals.

12. The method for controlling a multiplicative inverse arithmetic circuit according to claim 11, further comprising the steps of:

receiving said first initial value and said second initial value;

when the cycle count reaches a predetermined number k (k is a natural number), receiving a first control signal for permitting said first power arithmetic means to calculate s powers using $r=2^{k-1}$ and $32^r$, and a second control signal for permitting said second power arithmetic means to calculate s powers using $$r=\{(m-1)\mathrm{mod}(2^{k-1})\}+1 \text{ and } s=2^r;$$

inputting, to said selection means of said multiplication module, a third control signal according to which, when bit k−1 in the binary expression for (m−1) is 1, the output of said second power multiplication means is transmitted to the input terminal of said second register means, and according to which, when bit k−1 in the binary expression for (m−1) is not 1, the output of said second register means is transmitted to the input terminal of said second register means.

13. The method for controlling a multiplicative inverse arithmetic circuit according to claim 12, further comprising the step of:

transmitting the output from said multiplication module to a pair of register means.

14. A method for controlling a multiplicative inverse arithmetic circuit that includes two multiplication modules each of which includes a first input unit and a second input unit, for multiplying m bits of data in a Galois field $GF(2^m)$ (m≧1), comprising:

first and second power arithmetic means for receiving the first m bits of data from said first input unit;

first multiplication means for receiving said first m bits of data and the output of said first power arithmetic means;

second multiplication means for receiving second m bits of data from said second input unit and the output of said second power arithmetic means;

selection means for receiving an output signal from said second multiplication means and said second in bits of data; and control means for outputting a control signal to said first power arithmetic means, said second arithmetic means and said selection means, wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal; first register means for setting a first initial value, and second register means for setting a second initial value, wherein a first output of one of said multiplication modules is connected to said first input unit of the other multiplication module, and a second output of one of said multiplication modules is connected to said second input unit of the other multiplication module, said method comprising the steps of:

for a circuit formed by connecting said multiplication modules, connecting the output terminal of said first register means to said first input of said multiplication modules; and connecting the output terminal of said second register means to said second input unit of said multiplication modules.

15. The method for controlling a multiplicative inverse arithmetic circuit according to claim 14, wherein the number n (n is a natural number) of said multiplication modules is set equal to or smaller than $(\log_2(m-1)+1)$.

16. The method for controlling a multiplicative inverse arithmetic circuit according to claim 14, further comprising the steps of:

when the cycle count reaches a predetermined number q (q is a natural number), transmitting, to the i-th (n≧i≧1) multiplication module, a first control signal, which permits said first power arithmetic means to calculate s powers using $r=2^{p-1}$ and $s=2^r$, and a second control signal, which permits said second power arithmetic means to calculate s powers using $r=\{(m-1)\mathrm{mod}(2^{p-1})\}+1$ and $s=2^r$, while $p=\{n(q-1)+i\}$; and transmitting, to said selection means of said i-th multiplication module, a third control signal according to which, when bit p−1 in the binary expression (m−1) is 1, the output of said second multiplication means is transmitted to the second output terminal of said i-th multiplication module, and when bit p−1 in the binary expression (m−1) is not 1, in bit data for said second input unit of said i-th multiplication module is transmitted to the second output terminal of said i-th multiplication module.

17. A method for controlling a multiplicative inverse arithmetic circuit that includes at least three multiplication modules each of which includes a first input unit and a second input unit, for multiplying m bits of data in a Galois field $GF(2^m)$(m≧1), comprising:

first and second power arithmetic means for receiving the first m bits of data from said first input unit;

first multiplication means for receiving said first in bits of data and the output of said first power arithmetic means;

second multiplication means for receiving second m bits of data from said second input unit and the output of said second power arithmetic means;

selection means for receiving an output signal from said second multiplication means and said second m bits of data; and control means for outputting a control signal to said first power arithmetic means, said second arithmetic means and said selection means, wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal; first register means for setting a first initial value, and second register means for setting a second initial value, wherein a first output of one of said multiplication modules is connected to said first input unit of the other multiplication module, and wherein a second output of one of said multiplication modules is connected to said second input unit of the other multiplication module, said method comprising the steps of:

for a circuit formed by connecting said multiplication modules, connecting the output terminal of said first register means to said first input unit of said multiplication modules; and connecting the output terminal of said second register means to said second input unit of said multiplication modules.

18. A method for controlling a multiplicative inverse arithmetic circuit comprising the steps of:

providing $[\log 2(m-1)+1]$ multiplication modules each of which includes a first input unit and a second input unit, for multiplying m bits of data in a Galois field $GF(2^m)$ ($m \geq 1$), comprising:
first and second power arithmetic means for receiving the first m bits of data from said first input unit;
first multiplication means for receiving said first m bits of data and the output of said first power arithmetic means;
second multiplication means for receiving second m bits of data from said second input unit and the output of said second power arithmetic means;
selection means for receiving an output signal from said second multiplication means and said second m bits of data; and
control means for outputting a control signal to said first power arithmetic means, said second arithmetic means and said selection means,
wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal; and
providing a first control signal group, a second control signal group and a third control signal group for respectively controlling said multiplication modules, with the first output terminal of each of said multiplication modules being connected to the first input terminal of a succeeding multiplication module, and the second output terminal of each of said multiplication modules being connected to the second input terminal of a succeeding multiplication module;
providing, for first power arithmetic means, a first control signal for permitting a k-th (k is a natural number) multiplication module to calculate s powers using $r=2^{k-1}$ and $s=2^r$;
providing, for second power arithmetic means, a second control signal for permitting said k-th multiplication module to calculate s powers using $r=\{(m-1)\mod(2^{k-1})\}+1$ and $s=2^r$;

providing the output of said second multiplication means as the output of selection means; when bit k−1 in binary expression of m−1 is 1; and
providing, as the output of said selection means, m bits of data received from said second input unit when said bit k−i in the binary expression m−1 is not 1.

19. An apparatus employing a multiplication module, including a first input unit and a second input unit, for multiplying m bits of data in a Galois field $GF(2^m)$ ($m \geq 1$), said multiplication module comprising:
first and second power arithmetic means for receiving the first m bits of data from said first input unit;
first multiplication means for receiving said first m bits of data and the output of said first power arithmetic means;
second multiplication means for receiving second m bits of data from said second input unit and the output of said second power arithmetic means;
selection means for receiving an output signal from said second multiplication means and said second m bits of data; and
control circuit for outputting a control signal to said first power arithmetic means, said second power arithmetic means and said selection means,
wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal.

20. An apparatus including a multiplicative inverse arithmetic circuit that comprises:
a multiplication module including a first input unit and a second input unit, for multiplying m bits of data in a Galois field $GF(2^m)$ ($m \geq 1$), comprising:
first and second power arithmetic means for receiving the first m bits of data from said first input unit;
first multiplication means for receiving said first m bits of data and the output of said first power arithmetic means;
second multiplication means for receiving second m bits of data from said second input unit and the output of said second power arithmetic means;
selection means for receiving an output signal from said second multiplication means and said second m bits of data; and
control means for outputting a control signal to said first power arithmetic means, said second arithmetic means and said selection means,
wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal;
first register means for setting a first initial value and for receiving a first output signal from said multiplication module; and
second register means for setting a second initial value and for receiving a second output signal from said multiplication module,
wherein the output terminal of said first register means is connected to said first input unit of said multiplication module, and the output terminal of said second register means is connected to said second input unit of said multiplication module, and
wherein said second register means provides the multiplicative inverse of said first initial value in accordance with said first, second and third control signals.

21. The apparatus according to claim 20, wherein said first and said second register means respectively receive said first initial value and said second initial value; wherein, when the cycle count reaches a predetermined number k (k is a natural number), said control means receives a first control signal for permitting said first power arithmetic means to calculate s powers using $r=2^{k-1}$ and $s=2^r$, and a second control signal for permitting said second power arithmetic means to calculates powers using $r=\{(m-1)\mod(2^{k-1})\}+1$ and $s=2^r$; and
wherein said selection means of said multiplication means receives a third control signal according to which, when bit k−1 in the binary expression for (m−1) is 1, the output of said second multiplication means is transmitted to the input terminal of said second register means, and according to which, when bit k−1 in the binary expression for (m−1) is not 1, the output of said second register means is transmitted to the input terminal of said second register means.

22. An apparatus including a multiplicative inverse arithmetic circuit that comprises:

two multiplication modules each of which includes a first input unit and a second input unit, for multiplying m bits of data in a Galois field GF($2^m$)(m≧1), comprising:
first and second power arithmetic means for receiving the first m bits of data from said first input unit;
first multiplication means for receiving said first m bits of data and the output of said first power arithmetic means;
second multiplication means for receiving second m bits of data from said second input unit and the output of said second power arithmetic means;
selection means for receiving an output signal from said second multiplication means and said second m bits of data; and
control means for outputting a control signal to said first power arithmetic means, said second arithmetic means and said selection means,
wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal;
first register means for setting a first initial value; and
second register means for setting a second initial value,
wherein a first output of one of said multiplication modules is connected to said first input unit of the other multiplication module, and a second output of one of said multiplication modules is connected to said second input unit of the other multiplication module, and
wherein, for a circuit formed by connecting said multiplication modules, the output terminal of said first register means is connected to said first input unit of said multiplication means, the output terminal of said second register means is connected to said second input unit of said multiplication modules, the input terminal of said first register means is connected to said first output unit of said multiplication means, and the input terminal of said second register means is connected to said second output unit of said multiplication modules.

23. The apparatus according to claim 22, wherein the number n (n is a natural number) of said multiplication modules is set equal to or smaller than [$\log_2(m-1)+1$].

24. The apparatus according to claim 22, wherein, when the cycle count reaches a predetermined number q (q is a natural number), said control means transmits to the i-th (n≧i≧1) multiplication module a first control signal, which permits said first power arithmetic means to calculate s powers using r=$2^{p-1}$ and s=$2^r$, and a second control signal, which permits said second power arithmetic means to calculate s powers using r={(m−1)mod($2^{p-1}$)}+1 and s=2r, while p={n(q−1)+i}; and wherein said selection means of said i-th multiplication module receives a third control signal according to which, when bit p−i in the binary expression (m−1) is 1, the output of said second multiplication means is transmitted to the second output terminal of said i-th multiplication module, and when bit p−1 in the binary expression (m−1) is not 1, in bit data for said second input unit of said i-th multiplication module is transmitted to the second output terminal of said i-th multiplication module.

25. The apparatus according to claim 22, wherein said multiplicative inverse arithmetic circuit further comprises:
a pair of register means connected to said multiplication means.

26. An apparatus including a multiplicative inverse arithmetic circuit that comprises:
at least three multiplication modules each of which includes a first input unit and a second input unit, for multiplying m bits of data in a Galois field GF($2^m$) (m≧1), comprising:
first and second power arithmetic means for receiving the first m bits of data from said first input unit;
first multiplication means for receiving said first m bits of data and the output of said first power arithmetic means;
second multiplication means for receiving second m bits of data from said second input unit and the output of said second power arithmetic means;
selection means for receiving an output signal from said second multiplication means and said second m bits of data; and
control means for outputting a control signal to said first power arithmetic means, said second arithmetic means and said selection means,
wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal;
first register means for setting a first initial value; and
second register means for setting a second initial value,
wherein a first output of one of said multiplication modules is connected to said first input unit of the other multiplication module, and a second output of one of said multiplication modules is connected to said second input unit of the other multiplication module, and
wherein, for a circuit formed by connecting said multiplication modules, the output terminal of said first register means is connected to said first input of said multiplication modules, the output terminal of said second register means is connected to said second input unit of said multiplication modules, the input terminal of said first register means is connected to said first output unit of said multiplication means, and the input terminal of said second register means is connected to said second output unit of said multiplication modules.

27. An apparatus including a multiplicative inverse arithmetic circuit that comprises:
(log 2(m−1)+1) multiplication modules each of which includes a first input unit and a second input unit, for multiplying m bits of data in a Galois field GF($2^m$) (m≧1), comprising:
first and second power arithmetic means for receiving the first m bits of data from said first input unit;
first multiplication means for receiving said first m bits of data and the output of said first power arithmetic means;
second multiplication means for receiving second m bits of data from said second input unit and the output of said second power arithmetic means;
selection means for receiving an output signal from said second multiplication means and said second m bits of data; and first control means for outputting a control signal to said first power arithmetic means, said second arithmetic means and said selection means, wherein said first power arithmetic means receives a first control signal, said second power arithmetic means receives a second control signal, and said selection means receives a third control signal, for controlling the output of said selection means, while said first multiplication means outputs a first output signal, and said selection means outputs a second output signal; and second control means, for providing a first control signal group, a second control signal group and a third control signal group for respectively controlling said multiplication modules, wherein the first output terminal of each of said multiplication modules is connected to the first input terminal of a succeeding multiplication module, and the second output terminal of each of said multiplication modules is connected to the second input terminal of a succeeding multiplication module, and wherein said second control means provides for first power arithmetic means a first control signal for permitting a k-th (k is a natural number) multiplication module to calculate s powers using $r=2^{k-1}$ and $s=2^r$, provides for second power arithmetic means a second control signal for permitting said k-th multiplication module to calculate s powers using $r=\{(m-1)\mathrm{mod}(2^{k-1})\}+1$ and $s=2^r$, provides the output of said second multiplication means as the output of selection means, when bit k−1 in binary expression of m−1 is 1, and provides, as the output of said selection means, m bits of data received from said second input unit when said bit k−1 in the binary expression m−1 is not 1.

28. A method, for controlling a multiplicative inverse arithmetic circuit, comprising the steps of:

transmitting, to multiplication means, m bits of data from a first input unit and the output of power arithmetic means in order to multiply said m bits of data in a Galois field $GF(2^m)(m \geq 1)$;

transmitting, to multiplication means, m bits of data from a second input unit and the output of said power arithmetic means;

transmitting a first control signal, which permits said first power arithmetic means to calculate s powers using $r=2^{p-1}$ and $s=2^r$, and a second control signal, which permits said second power arithmetic means to calculate s powers using $r=\{(m-1)\mathrm{mod}(2^{p-1})\}+1$ and $s=2^r$, while $p=\{n(q-1)+i\}$; and providing the output of said second multiplication means as the output of selection means, when bit k−1 in binary expression of m−i is 1, and providing, as the output of said selection means, m bits of data received from said second input unit when said bit k−1 in the binary expression m−1 is not 1.

29. A computer-readable recording medium on which source code is recorded that permits a computer to execute a multiplication method comprising the steps of:

transmitting, to multiplication means, m bits of data from a first input unit and the output of power arithmetic means in order to multiply said m bits of data in a Galois field $GF(2^m)(m \geq 1)$;

transmitting, to multiplication means, m bits of data from a second input unit and the output of said power arithmetic means;

transmitting a first control signal, which permits said first power arithmetic means to calculate s powers using $r=2-1$ and $s2^r$, and a second control signal, which permits said second power arithmetic means to calculate s powers using $r=\{(m-1)\mathrm{mod}(2^{p-1})\}+1$ and $s=2^r$, while $p=\{n(q-1)+i\}$; and providing the output of said second multiplication means as the output of selection means, when bit k−1 in binary expression of m−1 is 1, and providing, as the output of said selection means, m bits of data received from said second input unit when said bit k−i in the binary expression m1 is not 1.

30. A computer-readable transfer medium on which source code is recorded that permits a computer to execute a multiplication method comprising the steps of:

transmitting, to multiplication means, m bits of data from a first input unit and the output of power arithmetic means in order to multiply said m bits of data in a Galois field $GF(2^m)(m \geq 1)$;

transmitting, to multiplication means, m bits of data from a second input unit and the output of said power arithmetic means;

transmitting a first control signal, which permits said first power arithmetic means to calculate s powers using $r=2^{p-1}$ and $s=2^r$, and a second control signal, which permits said second power arithmetic means to calculate s powers using $r=\{(m-1)\mathrm{mod}(2^{p-1})\}+1$ and $s=2^r$, while $p=\{n(q-1)+i\}$; and providing the output of said second multiplication means as the output of selection means, when bit k−1 in binary expression of m−1 is 1, and providing, as the output of said selection means, m bits of data received from said second input unit when said bit k−i in the binary expression m−1 is not 1.

31. A cryptographic apparatus comprising:

multiplication means for receiving m bits of data from a first input unit and the output of power arithmetic means in order to multiply said m bits of data in a Galois field $GF(2^m)(m \geq 1)$;

multiplication means for receiving m bits of data from a second input unit and the output of said power arithmetic means;

means for transmitting, to a first power arithmetic means, a first control signal that permits said first power arithmetic means to calculate s powers using $r=2^{p-1}$ and $s=2^r$, and for transmitting, to a second power arithmetic means, a second control signal that permits said second power arithmetic means to calculate s powers using $r=\{(m-1)\mathrm{mod}(2^{p-1})\}+1$ and $s=2^r$, while $p=\{n(q-1)+i\}$; and means for providing the output of said second multiplication means as the output of selection means, when bit k−1 in binary expression of m−1 is 1, and providing, as the output of said selection means, m bits of data received from said second input unit when said bit k−1 in the binary expression m−1 is not 1.

32. An error correction decoder comprising:

multiplication means for receiving m bits of data from a first input unit and the output of power arithmetic means in order to multiply said m bits of data in a Galois field $GF(2^m)(m \geq 1)$;

multiplication means for receiving m bits of data from a second input unit and the output of said power arithmetic means;

means for transmitting, to a first power arithmetic means, a first control signal that permits said first power arithmetic means to calculate s powers using $r=2^{p-1}$ and $s=2^r$, and for transmitting, to a second power arithmetic means, a second control signal that permits said second power arithmetic means to calculate s powers using $r=\{(m-1)\mod(2^{p-1})\}+1$ and $s=2^r$, while $p=\{n(q-1)+i\}$; and means for providing the output of said second multiplication means as the output of selection means, when bit k−1 in binary expression of m−1 is 1, and providing, as the output of said selection means, m bits of data received from said second input unit when said bit k−1 in the binary expression m−1 is not 1.

33. An apparatus comprising:

multiplication means for receiving m bits of data from a first input unit and the output of power arithmetic means in order to multiply said m bits of data in a Galois field $GF(2^m)(m \geq 1)$;

multiplication means for receiving m bits of data from a second input unit and the output of said power arithmetic means;

means for transmitting, to a first power arithmetic means, a first control signal that permits said first power arithmetic means to calculate s powers using $r=2^{p-1}$ and $s=2^r$, and for transmitting, to a second power arithmetic means, a second control signal that permits said second power arithmetic means to calculate s powers using $r=\{(m-1)\mod(2^{p-1})\}+1$ and $s=2^r$, while $p=\{n(q-1)+i\}$; and means for providing the output of said second multiplication means as the output of selection means, when bit k−1 in binary expression of m−1 is 1, and providing, as the output of said selection means, m bits of data received from said second input unit when said bit k−1 in the binary expression m−1 is not 1.

* * * * *